(12) United States Patent
Xiong et al.

(10) Patent No.: US 11,307,071 B2
(45) Date of Patent: Apr. 19, 2022

(54) FLOW METERING CHAMBER FOR A GAS FLOW METER HAVING TRANSDUCER MOUNTING HOLES AND FAIRING MOUNTED IN THE GAS INLET

(71) Applicant: HUBEI CUBIC-RUIYI INSTRUMENT CO., LTD, Wuhan (CN)

(72) Inventors: Youhui Xiong, Wuhan (CN); Jun Wu, Wuhan (CN); Lipan Song, Wuhan (CN); Mingliang Li, Wuhan (CN)

(73) Assignee: HUBEI CUBIC-RUIYI INSTRUMENT CO., LTD, Wuhan (CN)

( * ) Notice: Subject to any disclaimer, the term of this patent is extended or adjusted under 35 U.S.C. 154(b) by 220 days.

(21) Appl. No.: 16/854,924

(22) Filed: Apr. 22, 2020

(65) Prior Publication Data
US 2020/0292364 A1 Sep. 17, 2020

Related U.S. Application Data

(63) Continuation-in-part of application No. PCT/CN2018/084351, filed on Apr. 25, 2018.

(30) Foreign Application Priority Data

Sep. 13, 2017 (CN) .......................... 201710824205.5

(51) Int. Cl.
*G01F 1/66* (2022.01)
(52) U.S. Cl.
CPC .................................. *G01F 1/662* (2013.01)

(58) Field of Classification Search
None
See application file for complete search history.

(56) References Cited

U.S. PATENT DOCUMENTS 5,461,931 A * 10/1995 Gill .......................... G01F 1/662
73/861.27
2015/0211905 A1* 7/2015 Drachmann ......... H04R 31/006
73/861.28

(Continued)

FOREIGN PATENT DOCUMENTS

| CN | 201010298742.9 A | 4/2011 |
| CN | 201310084985.6 A | 8/2013 |

(Continued)

*Primary Examiner* — Harshad R Patel
(74) *Attorney, Agent, or Firm* — Andrew C. Cheng

(57) ABSTRACT

The invention provides a gas flow metering gas chamber and a gas flow meter. The gas flow meter includes the gas flow metering gas chamber, a display device and a housing. The gas flow meter gas cell includes a cavity, a gas inlet, a gas outlet, two ultrasonic transducer mounting holes and a reflection device. The signal emitted by the first ultrasonic transducer installed in the first ultrasonic transducer mounting hole and the signal emitted by the second ultrasonic transducer installed in the second ultrasonic transducer mounting hole intersects with each other to form an L-shaped reflection passage. Compared with V-shaped, W-shaped, and N-shaped reflection structures, the effective distance between the two ultrasonic transducers of the present invention more is increased, the cross section of the cavity is reduced, and the rate of the gas flow is increased, which avoids contamination contained in the measured gas to contaminate the ultrasonic transducers and thereby improves the measurement accuracy.

15 Claims, 11 Drawing Sheets

(56) References Cited

U.S. PATENT DOCUMENTS

2016/0223373 A1    8/2016  Bar-On
2020/0400473 A1*  12/2020  Andrii ....................... G01F 5/00

FOREIGN PATENT DOCUMENTS

| CN | 201710062170.6 A | | 5/2017 |
|---|---|---|---|
| CN | 201710076766.1 A | | 6/2017 |
| CN | 201710824205.5 A | | 12/2017 |
| CN | 201721172556.4 U | | 3/2018 |
| CN | 108593026 A | * | 9/2018 |
| JP | 2002-105889 A | | 10/2003 |

* cited by examiner

110b

FLOW METERING CHAMBER FOR A GAS FLOW METER HAVING TRANSDUCER MOUNTING HOLES AND FAIRING MOUNTED IN THE GAS INLET

CROSS REFERENCE TO RELATED APPLICATION

This non-provisional patent application is a continuation-in-part of an international application No. PCT/CN2018/084351 which claims priority of Chinese patent application No. 201710824205.5, the entire content of which are incorporated herein by reference.

TECHNICAL FIELD

The present invention relates to the field of gas analysis, and in particular to a gas flow metering gas chamber and a gas flow meter.

BACKGROUND

Gas flow meters (abbreviated as gas meters) and biogas flow meters, which are used as measuring instruments to measure the volume of gas, can measure the gas flow conveniently. They have been rapidly popularized in recent years. In order to meet the requirements of the installation environment, the gas flow meters need to be designed to be small and compact, and the influence of pollutants in the flow passageway must be avoided to maintain the accuracy of the measurement results.

Gas meters usually use the ultrasonic principle to measure the gas flow rate. The measurement principle is as follows. Two sets of ultrasonic transducers are provided diagonally on both sides of a gas flow metering gas chamber. Firstly, the ultrasonic transducer at the gas inlet of the gas flow metering gas chamber sends ultrasonic waves downward to the ultrasonic transducer at the gas outlet of the gas flow metering gas chamber, and a propagation time T1 of the ultrasonic waves is measured, and then the ultrasonic transducer at the gas outlet of the gas flow metering gas chamber sends ultrasonic waves upward to the ultrasonic transducer at the gas inlet of the gas flow metering gas chamber, and a propagation time T2 of the ultrasonic waves is measured. Because the flow of gas affects the two propagation times, the two propagation times are different, and a flow velocity of the gas can be obtained by a predetermined formula. The gas flow can be obtained by multiplying the gas flow velocity by the cross-sectional area of the tube of the flow metering gas chamber. According to the measurement formula, the measurement accuracy is proportional to the effective propagation distance of the ultrasonic transducer in the direction of the gas flow, and is inversely proportional to the cross-sectional area of the tube of the chamber. Therefore, when designing the structure of the ultrasonic flow passageway, those skilled in the art should comprehensively consider the two key parameters of the effective propagation distance and the cross sectional area of the chamber in order to ensure accuracy.

Patent document EP0952430A1 proposes an X-shaped passageway structure, patent document wo2012063448 proposes a V-shaped passageway structure, patent document CN103471671B proposes an N-shaped passageway structure, and patent document CN103471672A proposes a W-shaped passageway structure. The effective distance between the two ultrasonic transducers of the four passageway structures is relatively short. The cross-sections of the V-shaped, N-shaped, and W-shaped gas chambers are square, the cross-sectional areas are relatively large, and the velocity of the gas flow to be measured is relatively low, which may reduce the measurement accuracy.

The patent document CN103245384B proposes an ultrasonic flow gas chamber used in an ultrasonic gas meter. The two ultrasonic transducers transmit signals to each other. The advantage is that the effective distance between the two ultrasonic transducers is relatively long, the cross section is small, and the gas flow velocity is fast. The disadvantage is that the pollutants in the gas flow being measured affect the ultrasonic transducers, such that the measurement accuracy cannot be guaranteed.

Patent documents DK177824 B1 and CN205333131U each propose an ultrasonic gas meter flow passageway structure. The flow passageway is approximately L-shaped, but signal transmitting direction of the two ultrasonic transducers substantially crosses the gas flow direction in an X-pattern. The advantage is that it can avoid the influence of pollutants to a certain extent, but these two mounting structures result in a short effective distance between the two ultrasonic transducers, a large gas chamber cross section, and a low gas flow velocity, thus leading to low measurement accuracy.

In summary, the existing technology cannot simultaneously solve the problems of short effective distance between the ultrasonic transducers, large cross-sectional area of the gas chamber, and the ultrasonic transducer being polluted by the measured gas flow. A new type of ultrasonic flow channel structure is desired which can solve the above problems simultaneously.

SUMMARY

In order to solve the above problem, in one aspect, the present invention provides a gas flow metering gas chamber which comprises a cavity with a gas inlet arranged at one end thereof and a gas outlet arranged at the other end thereof; a first ultrasonic transducer mounting hole being provided at the gas inlet, a second ultrasonic transducer mounting hole being provided at a side wall of the gas outlet, a signal emitting direction of the first ultrasonic transducer installed in the first ultrasonic transducer mounting hole being angled to a direction of the gas flow through the cavity, and a signal emitting direction of the second ultrasonic transducer installed in the second ultrasonic transducer mounting hole intersecting with the direction of the gas flow through the cavity, and a reflection device being provided at the gas outlet, an angle being formed between a reflection surface of the reflection device and the direction of the gas flow, and the reflection surface of the reflection device facing the signal emitting direction of the second ultrasonic transducer installed in the second ultrasonic transducer mounting hole, so that the signals emitted by the first ultrasonic transducer and the signals emitted by the second ultrasonic transducer form a reflection passage through the reflection surface of the reflection device; and a fairing mounted in the gas inlet, the fairing comprising a mounting portion, a connecting portion and a plurality of mounting projections connected between the mounting portion and the connecting portion, the mounting portion and the connecting portion both having ring configurations, outer diameters of the mounting portion and the connecting portion being less than an inner diameter of the gas inlet, gas intake holes being formed between an inner surface of the gas inlet and outer surfaces of the mounting portion and the connecting portion, the mounting portion and the connecting portion being spaced from each other to thereby form a gas flow channel therebetween, a gas guide hole being defined in the connecting portion, gas diffusely flowing in the gas intake holes of the fairing from front and rear ends of the fairing, and then flowing into the gas flow channel and the gas guide hole in turn and exiting the gas outlet.

Preferably, the first ultrasonic transducer mounting hole and the second ultrasonic transducer mounting hole are respectively equipped with ultrasonic transducers, and the ultrasonic signal emitted by any one of the ultrasonic transducers is absorbed by the other ultrasonic transducer after being reflected by the reflection surface of the reflection device.

Preferably, the signal emitting direction of the first ultrasonic transducer installed in the first ultrasonic transducer mounting hole and the direction of the gas flow through the cavity are at an angle $\alpha$ with respect to each other, and wherein the angle is in the range of $-30° \le \alpha \le -30°$.

Preferably, the signal emitting direction of the first ultrasonic transducer installed in the first ultrasonic transducer mounting hole and the direction of the gas flow through the cavity are at an angle $\alpha$ which is equal to 0° so that the signal emitting direction of the first ultrasonic transducer is parallel to the direction of the gas flow through the cavity.

Preferably, the reflection surface is flat and has a function of reflective function.

Preferably, the reflection surface of the reflective device and the direction of the gas flow through the cavity are at an angle $\beta$ with respect to each other, and wherein the angle $\beta$ is in the range of $15° \le \beta \le 75°$.

Preferably, the reflection surface is concave and has a function of reflective function.

Preferably, the reflection surface and the direction of the gas flow through the cavity are at an angle $\beta$ with respect to each other, and wherein the angle $\beta$ is in the range of $5° \le \beta \le 45°$.

Preferably, the gas inlet has a ring shape and defines mounting slots at an inner surface thereof, and the fairing comprises mounting projections slid into the mounting slots to thereby mount the fairing into the gas inlet.

Preferably, the gas flow channel is defined as an annular space by the mounting portion and the connecting portion, and the gas diffuses from the periphery of the annular space to a middle of the annular space, and then flows into the air guide holes of the connecting portion.

Preferably, a shielding cover is provided at a middle of the mounting portion and the first ultrasonic transducer mounting hole facing the gas guide hole is formed at the shielding cover.

Preferably, the cavity comprises an middle tube and a mounting frame, an end of the middle tube connected to the connecting portion is defined as an entrance of the tube which has an inner diameter gradually becoming greater in a direction toward the connecting portion to allow the gas flow to smoothly flow into the middle tube from the air guide hole, the mounting frame is configured to install a circuit board thereat, and the circuit board is configured to connected with the first and second ultrasonic transducers.

Preferably, a diameter of the entrance of the tube is greater than or equal to a diameter of the middle tube of the cavity, and a diameter of the gas outlet is greater than or equal to the diameter of the middle tube of the cavity.

Preferably, the shape of the gas inlet is circular or trumpet.

Preferably, a fairing is provided at the gas inlet, the size and shape of the fairing matches the size and shape of the gas inlet, and the fairing includes a shielding cover and a plurality of gas intake holes surrounding the shielding cover, the first ultrasonic transducer mounting hole being defined in the fairing so that measured gas entering the gas inlet after passing through the gas intake holes.

Preferably, the signal emitting direction of the second ultrasonic transducer installed in the second ultrasonic transducer mounting hole is perpendicular to the direction of the gas flow through the cavity, and the signals emitted by the first ultrasonic transducer and the signals emitted by the second ultrasonic transducer form an L-shaped reflection passage at the reflection surface of the reflection device.

In another aspect, the present invention provides a gas flow meter which comprises a display device, a housing and the gas flow metering gas chamber of described above.

In summary, the present invention provides a gas flow metering gas chamber and a gas flow meter. The gas flow meter includes the gas flow metering gas chamber, the display device and the housing. The gas flow metering gas chamber includes a cavity and a gas inlet, a gas outlet, two ultrasonic transducer mounting holes and a reflection device. The signal emitted by the first ultrasonic transducer installed in the first ultrasonic transducer mounting hole and the signal emitted by the second ultrasonic transducer installed in the second ultrasonic transducer mounting hole intersects with each other to form an L-shaped reflection passage. Compared with V-shaped, W-shaped, and N-shaped reflecting structures, the effective distance between the two ultrasonic transducers of the present invention more is increased, the cross section of the cavity is reduced, and the flow rate of the gas is increased, which avoids contamination contained in the measured gas to contaminate the ultrasonic transducer and thereby improves the measurement accuracy.

It should be understood that the above general description and the following detailed description are only exemplary and do not limit the scope of the present disclosure.

DETAILED DESCRIPTION OF THE EMBODIMENTS

Figure 1:
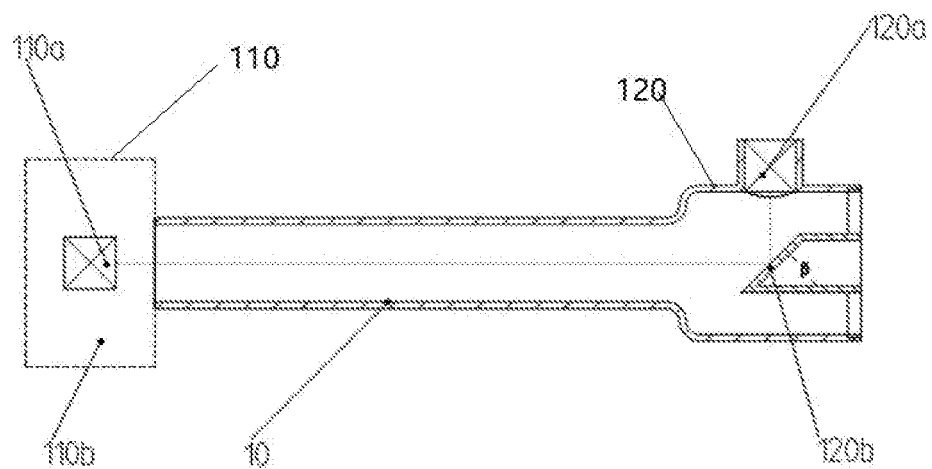
FIG. 1 illustrates a gas flow metering gas chamber in accordance with Embodiment 1.

The technical solutions of the present invention will be further specifically described below through the embodiments and the accompanying drawings.

Cavity 10, Gas inlet 110, mounting slot 112, Gas outlet 120, bracket 121, First ultrasonic transducer mounting hole 110a, Second ultrasonic transducer mounting hole 120a, Reflection surface 120b, Fairing 110b, Shielding cover 130, Intake hole 140, L-shaped passage 150, Gas flow channel 180, Mounting portion 50 Connecting portion 60, Mounting projection, 70, Gas guide hole 61, Middle tube 15, Protrusion 151, Locking hole 152, Mounting frame 16, Gas flow meter 90, First space 901, Second space 902, First gas port 91, Second gas port 92, Partition plate 95, Entrance of tube 153

Embodiment 1

Figure 2:
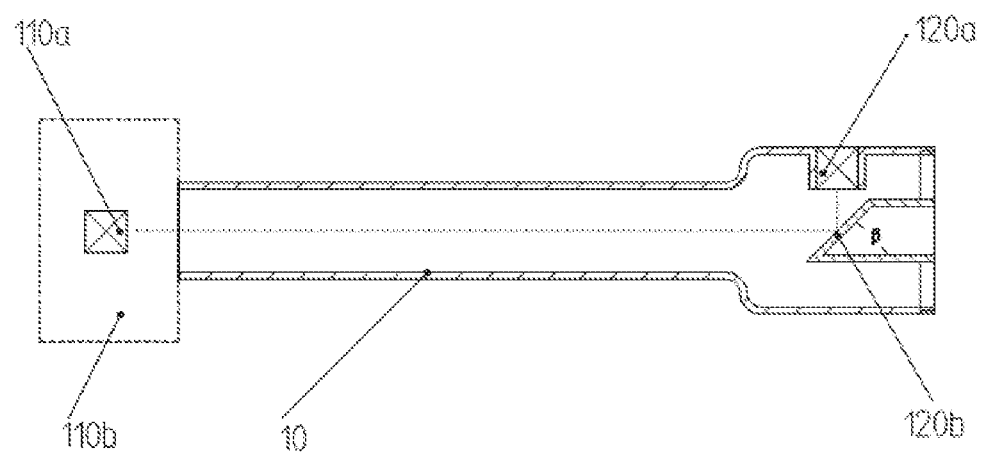
FIG. 2 illustrates an alternative gas flow metering gas chamber in accordance with Embodiment 1.
Figure 3:
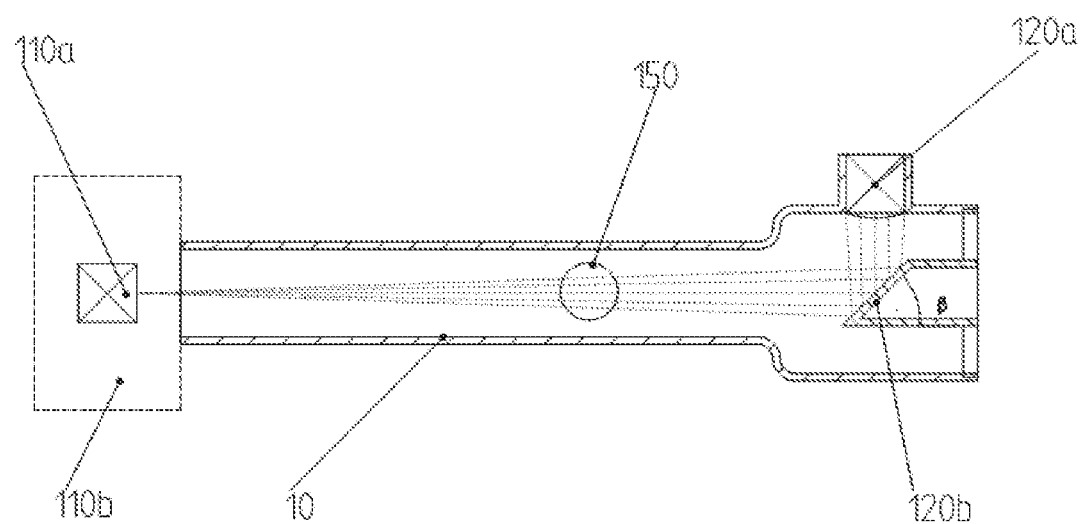
FIG. 3 illustrates an L-shaped ultrasonic signal passage formed in the gas flow metering gas chamber of Embodiment 1.
Figure 16:
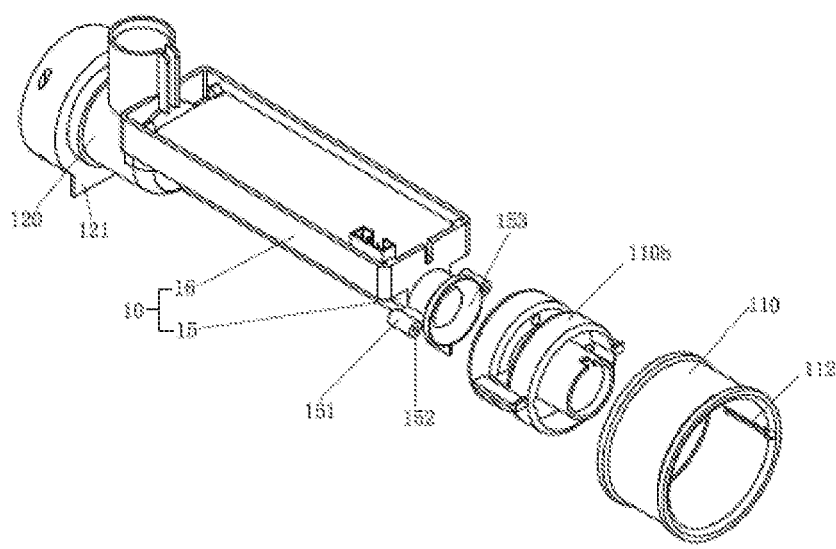
FIG. 16 is an exploded view of the gas flow metering gas chamber of Example 1.

Referring to FIG. 1, FIG. 2 and FIG. 16, a gas flow metering gas chamber includes a cavity 10, a gas inlet 110 provided at one end of the cavity 10, and a gas outlet 120 provided at the other end of the cavity 10. The measured gas enters the gas inlet 110, flows through the cavity 10, and then flows out of the gas outlet 120. The cavity 10 has a circular cross section, and a first ultrasonic transducer mounting hole 110a is provided at the gas inlet 110, and a second ultrasonic transducer mounting hole 120a is provided on a side wall near the gas outlet 120. As shown in FIG. 1, the second ultrasonic transducer mounting hole 120a may be formed at the outer sidewall near the gas outlet 120. As shown in FIG. 2, the second ultrasonic transducer mounting hole 120a may also be formed at the inner side wall near the gas outlet 120. The first ultrasonic transducer mounting hole 110a and the second ultrasonic transducer mounting hole 120a both are configured for mounting an ultrasonic transducer thereat. The signal emitting direction of the first ultrasonic transducer installed in the first ultrasonic transducer mounting hole 110a and the direction of the gas flow through the cavity are at an angle $\alpha$ with respect to each other, and the angle $\alpha$ is in the range of $-30°\leq\alpha\leq30°$. The signal emitting direction of the first ultrasonic transducer installed in the first ultrasonic transducer mounting hole 110a as shown in FIGS. 1-3 is parallel to the direction of the gas flow through the cavity 10, and $\alpha=0°$ is the best embodiment.

The signal emitting direction of the second ultrasonic transducer installed in the second ultrasonic transducer mounting hole 120a intersects with the direction of the gas flow through the cavity 10. In this embodiment, the signal emitting direction of the second ultrasonic transducer installed in the second ultrasonic transducer mounting hole 120a is preferably perpendicular to the direction of the gas flow through the cavity 10. A reflection device is provided at the gas outlet 120, and an angle is formed between the reflection surface 120b of the reflection device and the direction of the gas flow through the cavity 10. The reflection surface 120b of the reflection device faces to the second ultrasonic transducer installed in the second ultrasonic transducer mounting hole 120a. The angle $\beta$ between the reflection surface 120b of the reflection device and the direction of the gas flow is in the range of $15°\leq\beta\leq75°$, the preferred is $\beta=45°$.

The first ultrasonic transducer mounting hole 110a and the second ultrasonic transducer mounting hole 120a are respectively installed with ultrasonic transducers, and the ultrasonic signal emitted by any one of the ultrasonic transducers is reflected by the reflection surface 120b of the reflection device and then absorbed by the other ultrasonic transducer. As shown in FIG. 3, the signal emitting direction of the first ultrasonic transducer installed in the first ultrasonic transducer mounting hole 110a and the signal emission direction of the second ultrasonic transducer installed in the second ultrasonic transducer mounting hole 120a are intersected at the reflection surface 120b to form an L-shaped passage 150 as a reflection passage. The L-shaped passage 150 is the same as or similar to the English capital letter "L".

The measurement process is as following: at a moment, the ultrasonic transducer installed in the first ultrasonic transducer mounting hole 110a emits an ultrasonic signal which propagates along the direction of the gas flow and reaches the reflection surface 120b and is then reflected by the reflection surface 120b and absorbed by the ultrasonic transducer installed in the second ultrasonic transducer mounting hole 120a. Similarly, at another moment, the ultrasonic signal emitted by the ultrasonic transducer installed in the second ultrasonic transducer mounting hole 120a reaches the reflection surface 120b, and after being reflected by the reflection surface 120b, propagates against the direction of the gas flow and then reaches the first ultrasonic transducer mounting hole 110a and is absorbed by the ultrasonic transducer installed in the first ultrasonic transducer mounting hole 110a. The signal emitting direction of the first ultrasonic transducer installed in the first ultrasonic transducer mounting hole 110a and the signal emission direction of the second ultrasonic transducer installed in the second ultrasonic transducer mounting hole 120a are intersected at the reflection surface 120b to form an L-shaped passage 150. The reflection surface 120b has a reflection function, and the reflection surface is preferably a flat surface. The angle $\beta$ between the reflection surface 120b of the reflection device and the direction of the gas flow is in the range of $15°\leq\beta\leq75°$. The reflection surface is preferably a flat surface and the angle $\beta$ is preferably equal to 45°, which can prevent dust, pollutants, etc contained in the measured gas from being accumulated on the reflection surface to form a cover affecting the reflection angle of the reflective surface. In this embodiment, only the flat reflection surface is taken as an example for illustration. The volume of the gas flow flowing through the cavity 10 can be calculated based on the effective propagation passage of the ultrasonic signal between the two ultrasonic transducers, the cross-sectional area of the cavity 10, and the difference between the time when the ultrasonic signal propagates against the flow direction of the gas flow and the time when the ultrasonic signal propagates along the flow direction of the gas flow.

Referring to FIG. 16, the cavity 10 comprises a middle tube 15 and a mounting bracket 16. The end of the middle tube 15 connected to the fairing 110b acts as the entrance 153 of the tube 15.

Figure 6:
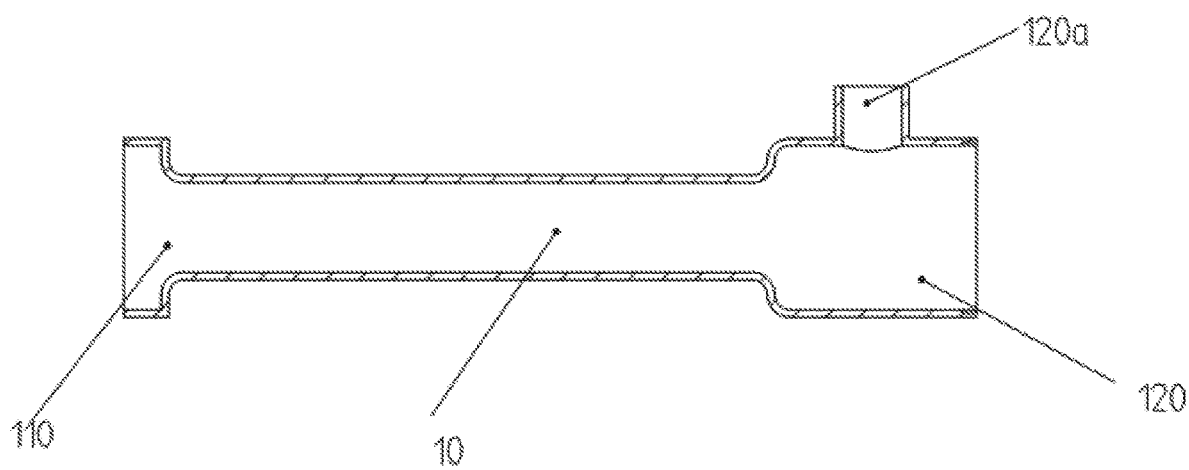
FIG. 6 is a front plan view of the gas flow metering gas chamber with a circular gas inlet of Embodiment 1.
Figure 7:
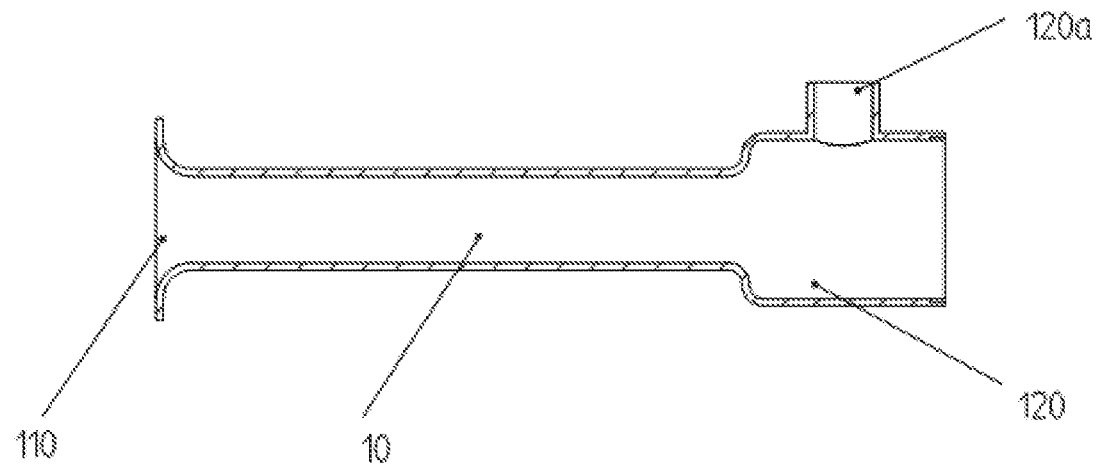
FIG. 7 is a front plan view of the gas flow metering gas chamber with a trumpet-shaped gas inlet of Embodiment 1.

Referring to FIG. 6 and FIG. 7, in order to increase the velocity of the gas flow through the cavity 10 and reduce the pressure loss, the diameter of the entrance 153 of the tube 15 is set to be greater than the diameter of the middle portion of the cavity 10, and the diameter of the gas outlet 120 is set to be greater than or equal to the diameter of the middle portion of the cavity 10. The shape of the entrance 153 of the tube 15 may be circular (as shown in FIG. 6) or trumpet (as shown in FIG. 7).

Figure 8:
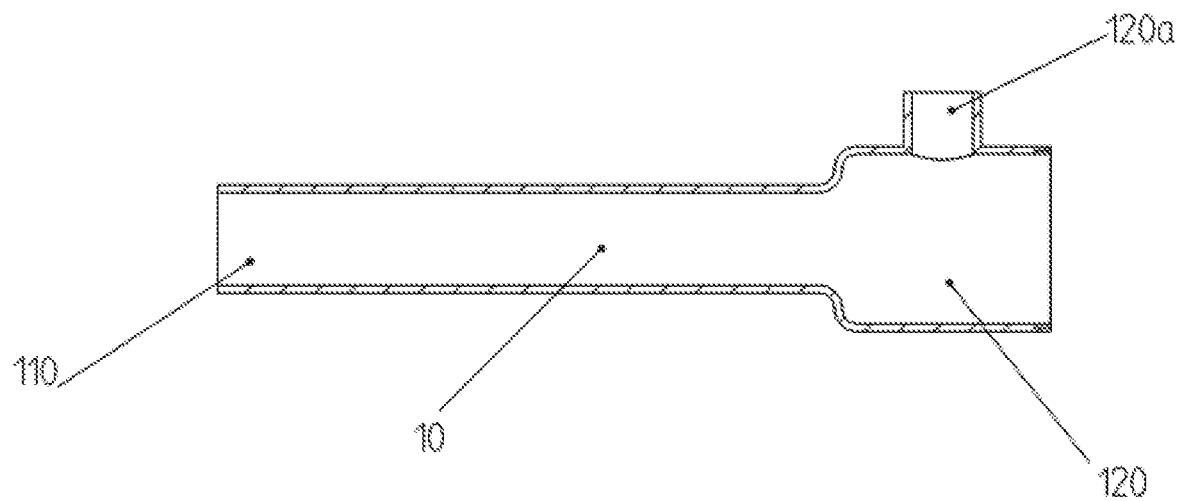
FIG. 8 is a front view of the gas flow metering gas chamber of Embodiment 1.

Referring to FIG. 8, since the fairing 110b is provided at the front end of the gas inlet 110 (as shown in FIG. 1), the diameter of the gas outlet 120 may be set to be larger than the diameter of the middle portion of the cavity 10 while the diameter of the entrance 153 of the tube 15 is set to be equal to the diameter of the middle portion of the cavity 10 (as shown in FIG. 8).

Figure 9:
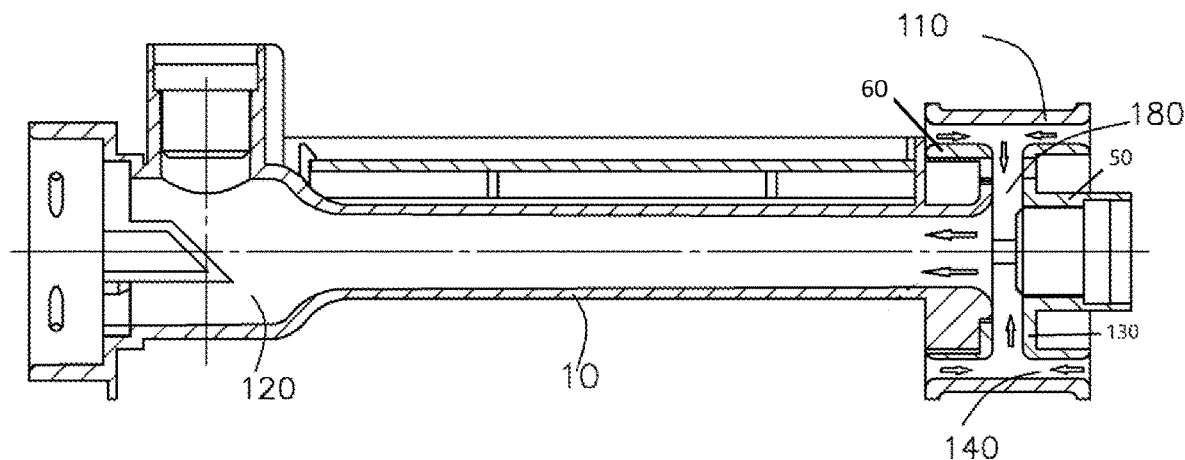
FIG. 9 is a gas flow diagram of a fairing located at the gas inlet of Embodiment 1.

Referring to FIG. 1 and FIG. 9, in order to form a stable flow field within the cavity 10 and improve the accuracy of the measured result, the fairing 110b is provided at the gas inlet 110. The size and shape of the fairing 110b match the size and shape of the gas inlet 110. The fairing 110b includes a shielding cover 130 and a plurality of air intake holes 140 surrounding the shielding cover 130. The first ultrasonic transducer mounting hole 110a is formed in the fairing 110b, and the measured gas enters the gas inlet 110 through the plurality of air intake holes 140, which can prevent the ultrasonic transducer installed in the first ultrasonic transducer mounting hole 110a from being lashed by the measured gas directly and effectively keep the ultrasonic transducer clean, thereby improving the accuracy of the test results.

Figure 10:
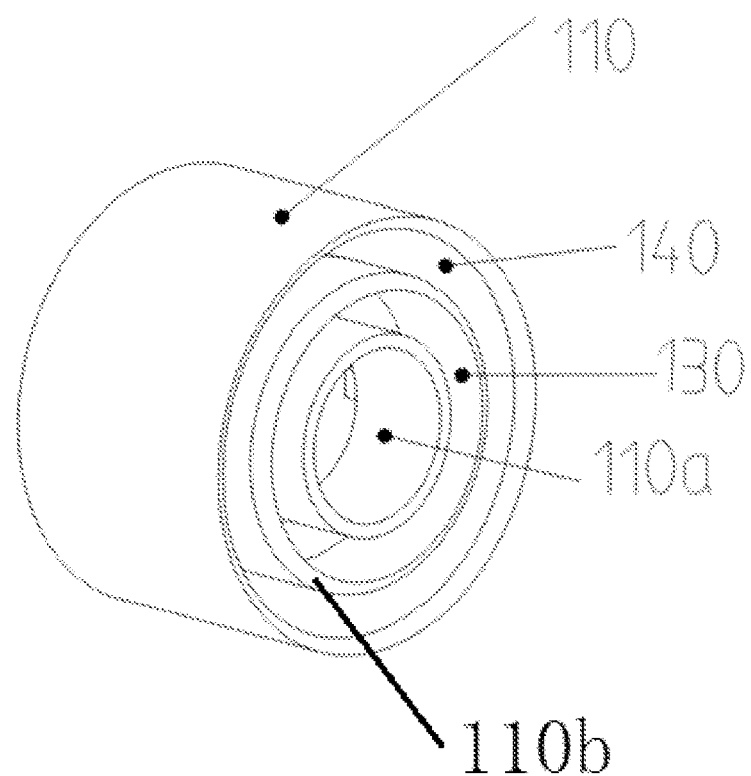
FIG. 10 is a perspective view of the fairing and the gas inlet of Example 1.

FIG. 9, FIG. 10 and FIG. 16 show the structures of a gas flow metering gas chamber and a fairing 110b. The shape of the fairing 110b match the shape of the circular gas inlet 110 of the gas flow metering gas chamber as shown in FIGS. 1, 2, 3, 4, 5 and 6. The gas inlet 110 of the gas flow metering gas chamber has a ring shape. In order to facilitate installing the fairing 110b in the ring gas inlet 10, a plurality of mounting slots 112 are defined in the inner surface of the ring gas inlet 110, and the outlet 120 is provided with a bracket 121 for convenient placement and installation of the gas flow metering gas chamber.

Referring to FIGS. 9-10 and FIGS. 16-20, the fairing 110b includes a mounting portion 50, a connecting portion 60, and a plurality of mounting projections 70. The mounting portion 50 and the connecting portion 60 both have ring-shaped configurations, and their outer diameters are less than the inner diameter of the gas inlet 110. The mounting portion 50 and the connecting portion 60 are spaced from each other with a gas flow channel 180 formed therebetween for providing an access to the gas flow flowing into the fairing 110b. Since the mounting portion 50 and the connecting portion 60 both have ring-shaped configurations, the gas flow channel 180 is defined as an annular space, and the gas flow diffuses from the periphery of the annular space to the middle of the annular space, and then flows into the connecting portion 60.

Figure 17:
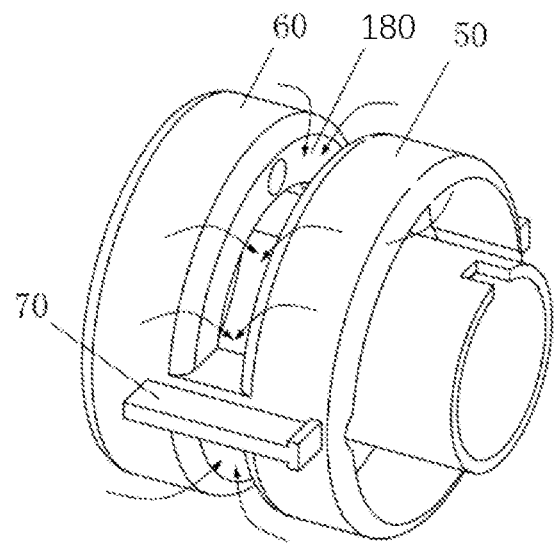
FIG. 17 is a block diagram of a fairing of the gas flow metering gas chamber of Embodiment 1.
Figure 18:
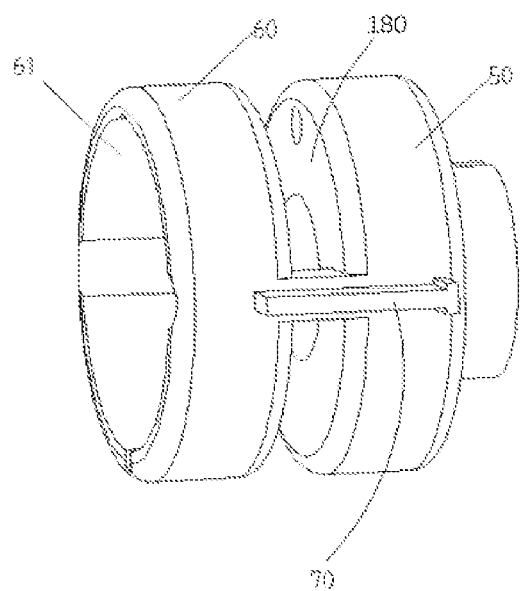
FIG. 18 is a side view of the fairing of the gas flow metering gas chamber of Example 1.
Figure 19:
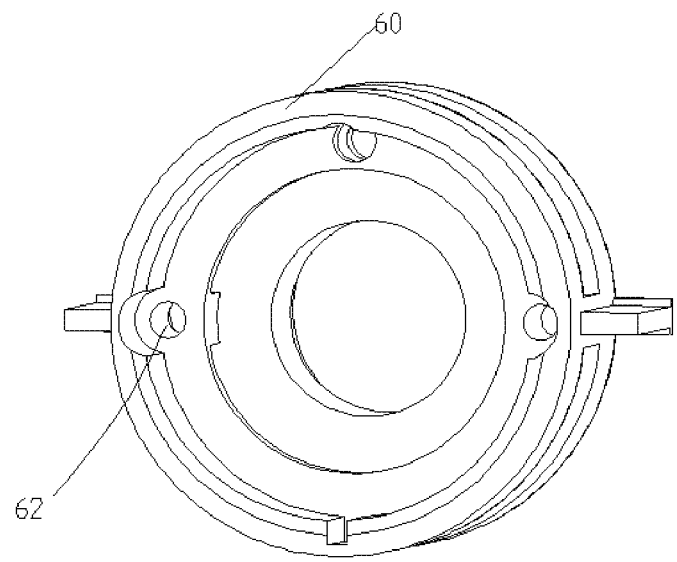
FIG. 19 is a front view of the fairing of the gas flow metering gas chamber of Example 1.

The mounting projection 70 is connected between the mounting portion 50 and the connecting portion 60 to fix the mounting portion 50 and the connecting portion 60 together. The mounting projection 70 can be slid into the mounting slots 112 of the gas inlet 110 to thereby fix the fairing 110b into the gas inlet 110. Since the outer diameters of the mounting portion 50 and the connecting portion 60 are smaller than the inner diameter of the gas inlet 110, after the fairing 110b is fixed into the gas inlet 110, air intake holes 140 are formed between the inner surface of the gas inlet 110 and the outer surfaces of the mounting portion 50 and the connecting portion 60 of the fairing 110b. Referring to FIGS. 9 and 17, the gas flow diffuses from the front end and the rear end of the fairing 110b into the gas inlet 140 and then diffuses from the peripheral portion of the annular space of the gas flow channel 180 to the middle portion of the annular space and then enters the connecting portion 60. Thus, the gas flow entering the connecting portion 60 is very stable.

The shielding cover 130 is provided at the middle of the mounting portion 50. The first ultrasonic transducer mounting hole 110a is formed in the shielding cover 130. A gas guiding hole 61 is provided in the central portion of the connecting portion 60, and the gas flows from the airflow channel 180 to the air guide hole 61. The first ultrasonic transducer mounting hole 110a faces the air guide hole 61.

The cavity 10 comprises an middle tube 15 and a mounting frame 16, the middle tube 15 is connected to the connecting portion 60, a plurality of fixing holes 62 is defined in the connecting portion 60, and a plurality of protrusions 151 is formed on the outside of the middle tube 15. Each protrusion 151 defines a locking hole 152. Several fasteners can be engaged in the fixing holes 62 and the locking holes 152 to fix the connecting portion 60 and the middle tube 15 together so that the air guide hole 61 of the connecting portion 60 communicates with the middle tube 15. The end of the middle tube 15 connected to the connecting portion 60 is defined as the entrance 153 of the tube and the diameter of the entrance 153 gradually becomes greater in a direction toward the connecting portion 60. After the connecting portion 60 and the middle tube 15 are fixed together, the gas flow can flow smoothly from the air guide hole 61 of the connecting portion 60 into the middle tube 15. The mounting frame 16 is configured to install a circuit board which is electrically connected to the first and second ultrasonic transducers for processing the electrical signals therefrom. In the embodiment, the direction in which the first ultrasonic transducer emits or receives the ultrasonic signal is parallel to the direction of the gas flow through the air guide hole 61, that is, the two directions are the same or opposite to each other.

Figure 20:
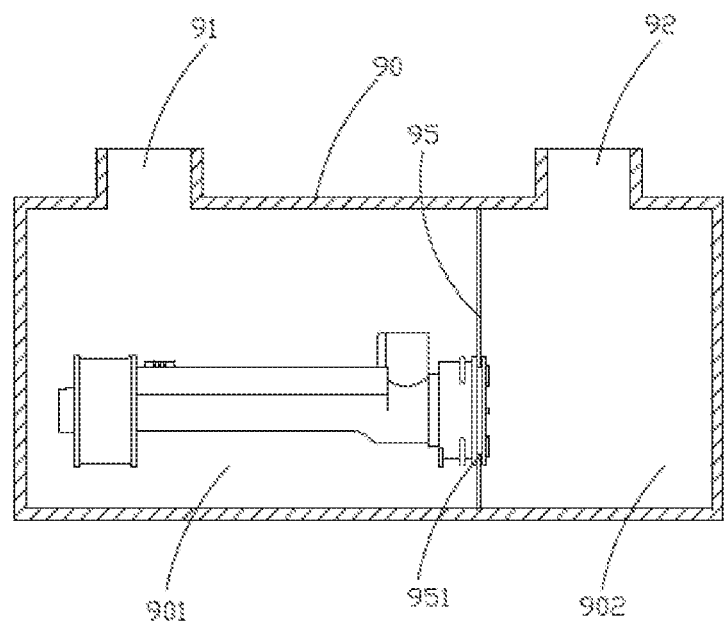
FIG. 20 illustrates a first installation manner of a gas flow meter of Embodiment 3.

FIG. 20 is a schematic diagram of the gas flow metering gas chamber of FIG. 1 in operation. Referring to FIG. 20, the gas flow metering gas chamber is installed in a gas flow meter 90. The gas flow meter 90 includes a first gas port 91 and a second gas port 92. A partition plate 95 is arranged in the gas flow meter 90 to divide the interior of the gas flow meter 90 into a first space 901 and a second space 902. The first gas port 91 communicates with the first space 901 and the second gas port 92 communicates with the second space 902. A mounting hole 951 is defined in the partition plate 95, the gas flow metering gas chamber is located in the first space 901, and the gas outlet 120 of the gas flow metering gas chamber is installed in the mounting hole 95. The gas outlet 120 leads the gas flowing through the gas flow metering gas chamber to the second space 902. During operation, the gas flows into the first space 901 from the first gas port 91 and diffuses uniformly in the first space 901. The gas flow in the first space 901 diffuses into the gas intake hole 140 of the fairing 110b and flows into the gas flow channel 180 and the gas guide hole 61, and then flows through the middle tube 15 and into the second space 902 from the gas outlet 120, and then exits the second space 902 via the second gas port 92. When the gas flows through the gas flow metering gas chamber, the first ultrasonic transducer and the second ultrasonic transducer installed in the gas flow metering gas chamber transmit and receive ultrasonic signals to measure the gas flow flowing through the gas flow metering gas chamber. Due to the gas flow metering gas chamber is arranged in the first space 901, the gas diffuses into the fairing 110b from the gas inlet 140 of the fairing 110b after being sufficiently diffused in the first space 901. Since the mounting portion 50 and the connecting portion 60 of the fairing 110b both have annular configurations, the gas flow channel 180 is defined as an annular space by the mounting portion 50 and the connecting portion 60, and the gas flow diffuses into the gas flow channel 180 from the front and rear ends of the fairing 110b and then diffuse from the peripheral portion of the annular space of the gas flow channel 180 to the middle portion of the annular space and then enters the gas guide hole 61, and then enters the cavity 10 (see FIG. 9 and FIG. 18), to ensure that the gas flow into the fairing 110b of the cavity 10 smoothly and inaccurate measurement results due to the fluctuation of the gas flow is avoided.

Figure 21:
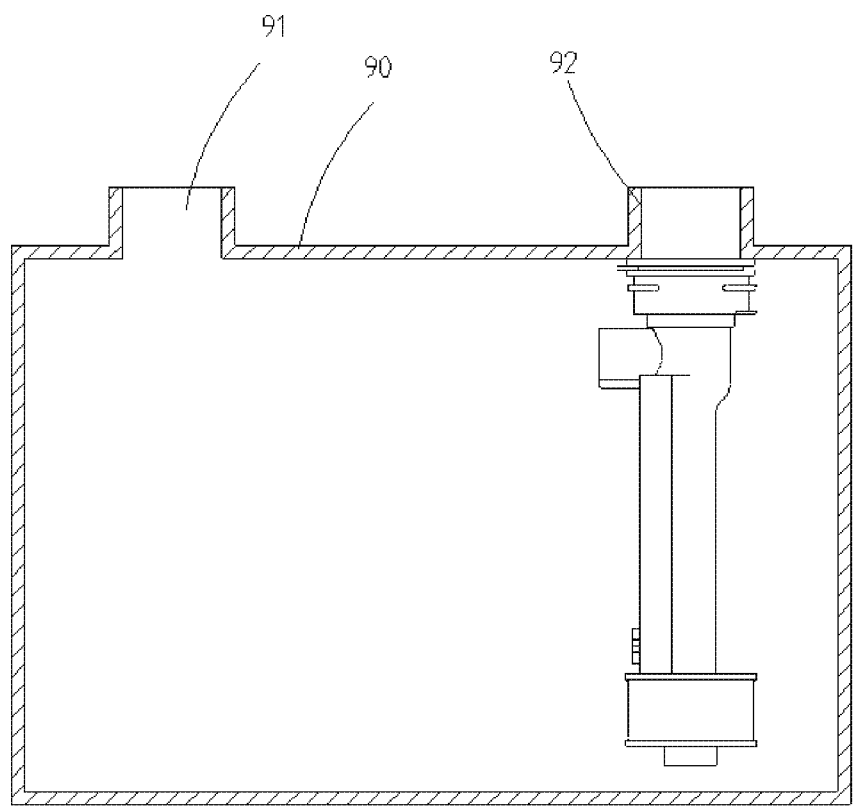
FIG. 21 illustrates a second installation method of the gas flow meter of Example 3.

FIG. 21 is a schematic diagram of another gas flow metering gas chamber of FIG. 1 in operation. In this embodiment, the gas flow meter 90 has no partition plate. The gas outlet 140 of the gas flow metering gas chamber is directly installed in the second gas port 92 of the air flow meter 90. During operation, the gas flows into the gas flow meter 90 from the first gas port 91 and is evenly diffused in the gas flow meter 90, and then diffuses into the fairing 110b and finally exits the gas flow meter 90 via the gas outlet 120.

Figure 11:
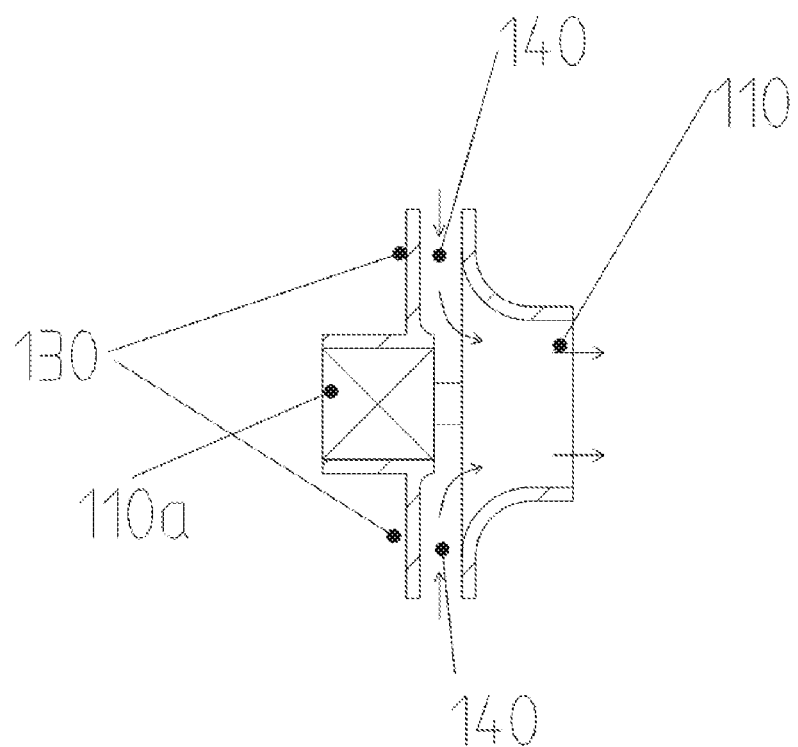
FIG. 11 is a gas flow diagram of another fairing of Embodiment 1.
Figure 12:
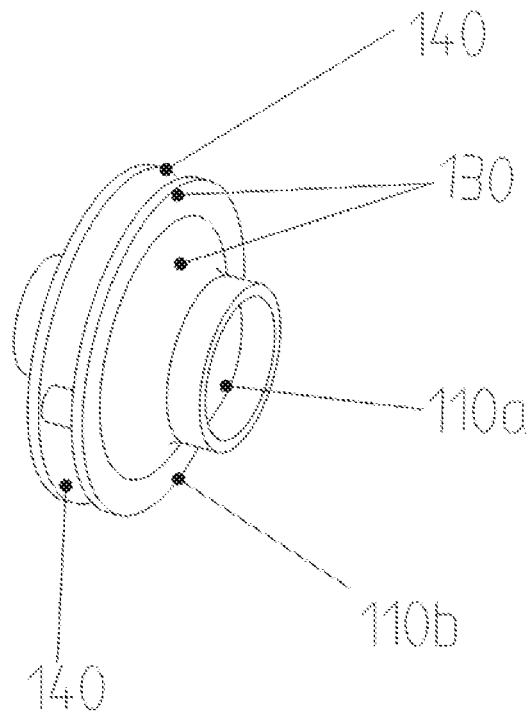
FIG. 12 is a perspective view of another fairing of Embodiment 1.

Referring to FIGS. 11 and 12, the structure of another fairing 110b is shown. The shape of the fairing 110b matches the shape of the trumpet-shaped gas inlet 110 of the gas flow metering gas chamber as shown in FIG. 7.

Figure 13:
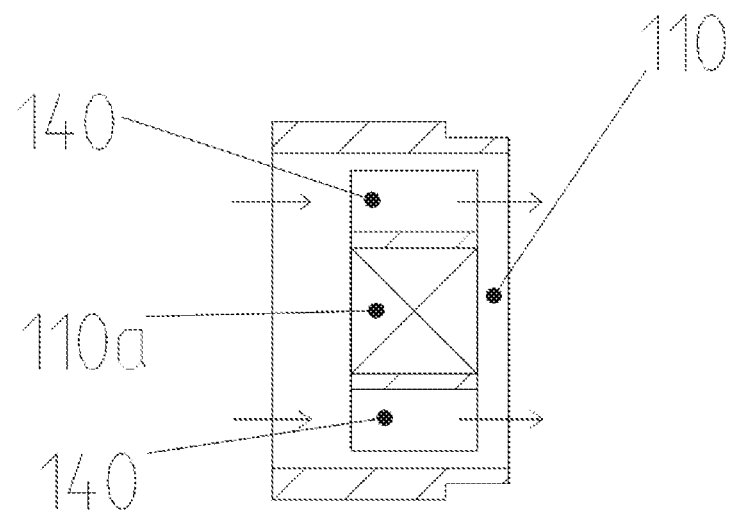
FIG. 13 is a gas flow diagram of a fairing of Embodiment 1.
Figure 14:
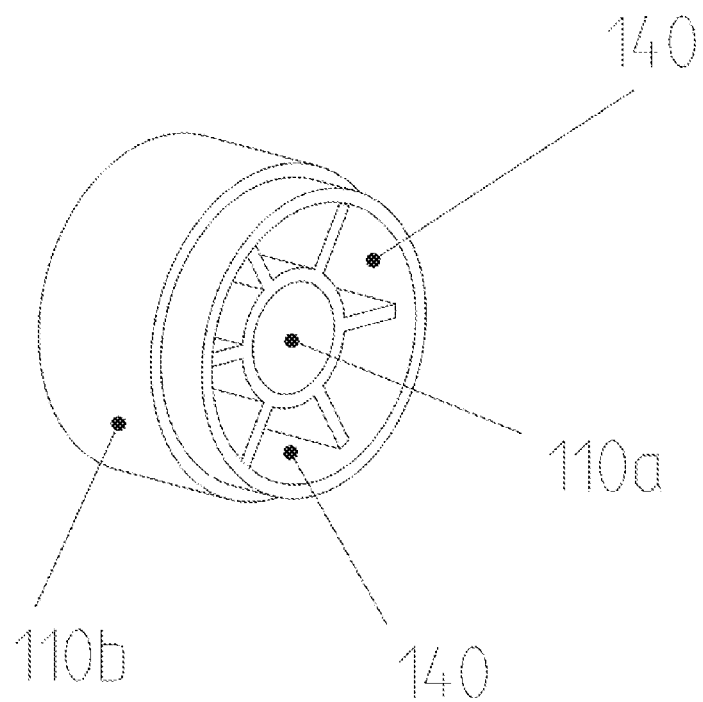
FIG. 14 is a perspective view of another fairing of Embodiment 1.

FIG. 13 and FIG. 14 show the structure of another fairing 110b. The shape of the fairing 110b matches the shape of the trumpet-shaped gas inlet 110 of the gas flow metering gas chamber as shown in FIG. 8.

Embodiment 2

Figure 4:
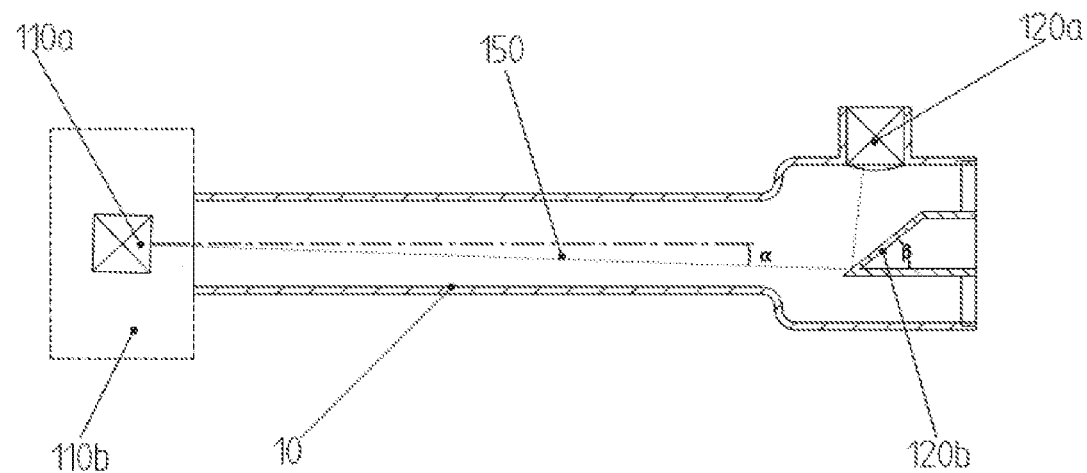
FIG. 4 illustrates a gas flow metering gas chamber in accordance with Embodiment 2.
Figure 5:
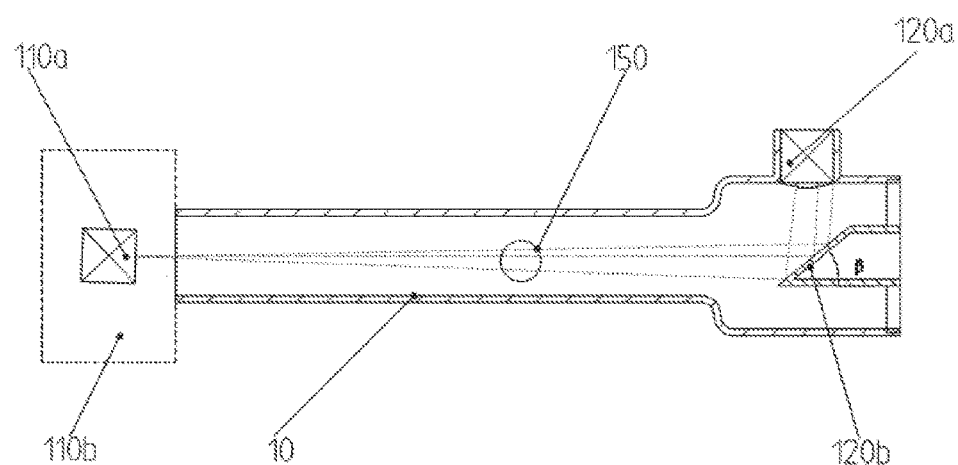
FIG. 5 illustrates an L-shaped ultrasonic signal passage formed in the gas flow metering gas chamber of Embodiment 2.

Referring to FIG. 4, the signal emitting direction of the first ultrasonic transducer installed in the first ultrasonic transducer mounting hole 110a and the direction of the gas flow through the cavity 10 are at an angle with respect to each other, and the angle α is equal to 5°. The signal emitting direction of the second ultrasonic transducer installed in the second ultrasonic transducer mounting hole 120a is perpendicular to the direction of the gas flow of the cavity 10. The first ultrasonic transducer mounting hole 110a and the second ultrasonic transducer mounting hole 120a are respectively equipped with ultrasonic transducers. The ultrasonic signal emitted by any one of the ultrasonic transducers is absorbed by the other ultrasonic transducer after being reflected by the reflection surface 120b of the reflective device. As shown in FIG. 5, the reflection surface 120b may be a concave surface. The angle β between the reflection surface 120b and the direction of the gas flow is in the range of $5°≤β≤45°$. In this embodiment, the angle β is equal to 45°. The signal emitted by the first ultrasonic transducer installed in the first ultrasonic transducer mounting hole 110a intersects with the signal emitted by the second ultrasonic transducer installed in the second ultrasonic transducer mounting hole 120a at the reflection surface 120b to form an L-shaped passage 150 as a reflection passage. The L-shaped passage 150 is the same as or similar to the English capital letter "L".

The measurement process is as following: at a moment, the ultrasonic transducer installed in the first ultrasonic transducer mounting hole 110a emits an ultrasonic signal which propagates along the flow direction of the gas flow and reaches the reflection surface 120b, and is then reflected by the reflection surface 120b to the second ultrasonic transducer mounting hole 120a and absorbed by the ultrasonic transducer installed in the second ultrasonic transducer mounting hole 120a. Similarly, at another moment, the ultrasonic signal emitted by the ultrasonic transducer installed in the second ultrasonic transducer mounting hole 120a reaches the reflection surface 120b, and after being reflected by the reflection surface 120b, propagates against the flow direction of the gas flow and then reaches the first ultrasonic transducer mounting hole 110a and is absorbed by the ultrasonic transducer installed in the first ultrasonic transducer mounting hole 110a. The signal emitted by the first ultrasonic transducer installed in the first ultrasonic transducer mounting hole 110a intersect with the signal emitted by the second ultrasonic transducer installed in the second ultrasonic transducer mounting hole 120a at the reflection surface 120b to form an L-shaped passage 150. The reflection surface 120b has a reflection function, and the reflection surface is a concave surface. The angle β between the reflection surface 120b of the reflection device and the flow direction of the air flow is in the range of $5°≤β≤45°$. In this embodiment, the angle β is equal to 45°. The volume of the gas flow flowing through the cavity 10 can be calculated based on the effective propagation passage between the two ultrasonic transducers, the cross-sectional area of the cavity 10, and the time difference between the time when the ultrasonic signal propagates against the flow direction of the air flow and the time when the ultrasonic signal propagates along the flow direction of the gas flow. In summary, the gas flow metering gas chamber provided in Embodiments 1 and 2 includes a cavity, a gas inlet, a gas outlet, and two ultrasonic transducer mounting holes. By setting the cross section of the air chamber cavity to be circular or other shapes, the signal emitted by the first ultrasonic transducer installed in the first ultrasonic transducer mounting hole 110a and the signal emitted by the second ultrasonic transducer installed in the second ultrasonic transducer mounting hole 120a intersects with each other to form an L-shaped reflection passage, which increases the effective distance between the two ultrasonic transducers. The cross section of the cavity is small, and the gas flow is fast, which avoids contamination contained in the measured gas to contaminate the ultrasonic transducers and thereby achieve the technical effect of improving measurement accuracy.

Embodiment 3

Figure 15:
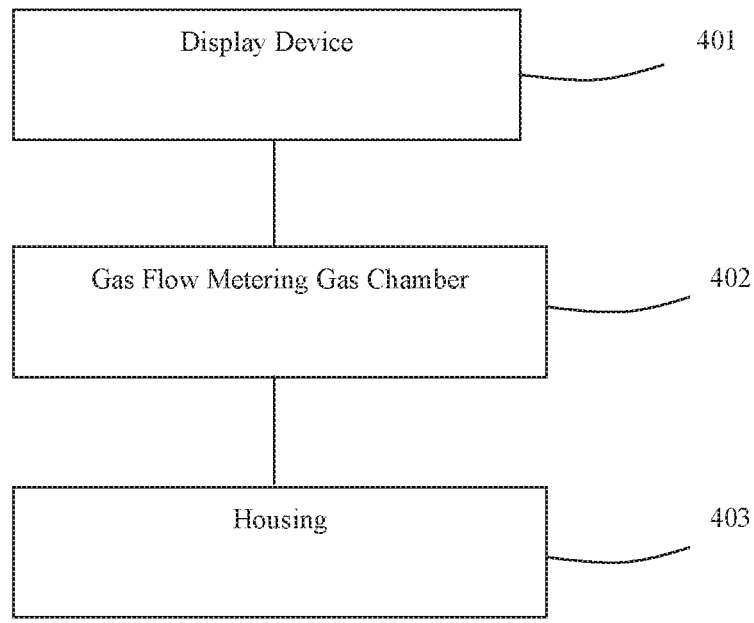
FIG. 15 is a block diagram of a gas flow meter according to Example 3.

Refer to FIG. 15, a gas flow meter includes a display device 401, the gas flow metering gas chamber 402 according to Embodiment 1, and a housing 403.

The display device 401 can display the total volume of the gas flow flowing through the gas flow meter.

In summary, the present invention provides a gas flow metering gas chamber and a gas flow meter. The gas flow meter includes the gas flow metering gas chamber, the display device and the housing. The gas flow metering gas chamber includes a cavity and a gas inlet, a gas outlet, two ultrasonic transducer mounting holes and a reflection device. The signal emitted by the first ultrasonic transducer installed in the first ultrasonic transducer mounting hole and the signal emitted by the second ultrasonic transducer installed in the second ultrasonic transducer mounting hole intersects with each other to form an L-shaped reflection passage. Compared with V-shaped, W-shaped, and N-shaped reflecting structures, the effective distance between the two ultrasonic transducers of the present invention more is increased, the cross section of the cavity is reduced, and the flow rate of the gas is increased, which avoids contamination contained in the measured gas to contaminate the ultrasonic transducer and thereby improves the measurement accuracy.

The specific embodiments described in the present invention merely exemplify the spirit of the present invention. A person skilled in the art to which the present invention belongs can make various modifications or supplement to the described specific embodiments or substitute in a similar manner without departing from the spirit or scope of the present invention. The embodiments illustrated herein should not be interpreted as limits to the present invention, and the scope of the invention is to be determined by reference to the claims that follow.

The invention claimed is:

1. A gas flow metering gas chamber, comprising:
a cavity with a gas inlet arranged at one end thereof and a gas outlet arranged at the other end thereof;
a first ultrasonic transducer mounting hole being provided at the gas inlet, a second ultrasonic transducer mounting hole being provided at a side wall of the gas outlet, a signal emitting direction of a first ultrasonic transducer installed in the first ultrasonic transducer mounting hole being angled to a direction of the gas flow through the cavity, and a signal emitting direction of a second ultrasonic transducer installed in the second ultrasonic transducer mounting hole intersecting with the direction of the gas flow through the cavity, and a reflection device being provided at the gas outlet, an angle being formed between a reflection surface of the reflection device and the direction of the gas flow, and the reflection surface of the reflection device facing the signal emitting direction of the second ultrasonic transducer installed in the second ultrasonic transducer mounting hole, so that the signals emitted by the first ultrasonic transducer and the signals emitted by the second ultrasonic transducer form a reflection passage through the reflection surface of the reflection device; and
a fairing mounted in the gas inlet, the fairing comprising a mounting portion, a connecting portion and a plurality of mounting projections connected between the mounting portion and the connecting portion, the mounting portion and the connecting portion both having ring configurations, outer diameters of the mounting portion and the connecting portion being less than an inner diameter of the gas inlet, gas intake holes being formed between an inner surface of the gas inlet and outer surfaces of the mounting portion and the connecting portion, the mounting portion and the connecting portion being spaced from each other to thereby form a gas flow channel therebetween, a gas guide hole being defined in the connecting portion, gas diffusely flowing in the gas intake holes of the fairing from front and rear ends of the fairing, and then flowing into the gas flow channel and the gas guide hole in turn and exiting the gas outlet, the ultrasonic signal emitted by any one of the ultrasonic transducers is absorbed by the other ultrasonic transducer after being reflected by the reflection surface of the reflection device.

2. The gas flow metering gas chamber of claim 1, wherein the signal emitting direction of the first ultrasonic transducer installed in the first ultrasonic transducer mounting hole and the direction of the gas flow through the cavity are at an angle $\alpha$ with respect to each other, and wherein the angle is in the range of $-30°\leq\alpha\leq30°$.

3. The gas flow metering gas chamber as claimed in claim 2, wherein the signal emitting direction of the first ultrasonic transducer installed in the first ultrasonic transducer mounting hole and the direction of the gas flow through the cavity are at an angle $\alpha$ which is equal to $0°$ so that the signal emitting direction of the first ultrasonic transducer is parallel to the direction of the gas flow through the cavity.

4. The gas flow metering gas chamber of claim 1, wherein the reflection surface is flat and has a function of reflective function.

5. The gas flow metering gas chamber of claim 4, wherein the reflection surface of the reflective device and the direction of the gas flow through the cavity are at an angle $\beta$ with respect to each other, and wherein the angle $\beta$ is in the range of $15°\leq\beta\leq75°$.

6. The gas flow metering gas chamber of claim 1, wherein the reflection surface is concave and has a function of reflective function.

7. The gas flow metering gas chamber of claim 6, wherein the reflection surface and the direction of the gas flow through the cavity are at an angle $\beta$ with respect to each other, and wherein the angle $\beta$ is in the range of $5°\leq\beta\leq45°$.

8. The gas flow metering gas chamber of claim 1, wherein the gas inlet has a ring shape and defines mounting slots at an inner surface thereof, and the fairing comprises mounting projections slid into the mounting slots to thereby mount the fairing into the gas inlet.

9. The gas flow metering gas chamber of claim 1, wherein the gas flow channel is defined as an annular space by the mounting portion and the connecting portion, and the gas diffuses from the periphery of the annular space to a middle of the annular space, and then flows into the air guide holes of the connecting portion.

10. The gas flow metering gas chamber of claim 9, wherein a shielding cover is provided at a middle of the mounting portion and the first ultrasonic transducer mounting hole facing the gas guide hole is formed at the shielding cover.

11. The gas flow metering gas chamber of claim 10, wherein the cavity comprises a middle tube and a mounting frame, an end of the middle tube connected to the connecting portion is defined as an entrance of the tube which has an inner diameter gradually becoming greater in a direction toward the connecting portion to allow the gas flow to smoothly flow into the middle tube from the air guide hole, the mounting frame is configured to install a circuit board thereat, and the circuit board is configured to connected with the first and second ultrasonic transducers.

12. The gas flow metering gas chamber of claim 1, wherein a diameter of the entrance of the tube is greater than or equal to a diameter of the middle tube of the cavity, and a diameter of the gas outlet is greater than or equal to the diameter of the middle tube of the cavity.

13. The gas flow metering gas chamber of claim 12, wherein the entrance of the middle tube is circular-shaped or trumpet-shaped.

14. The gas flow metering gas chamber of claim 1, wherein the signal emitting direction of the second ultrasonic transducer installed in the second ultrasonic transducer mounting hole is perpendicular to the direction of the gas flow through the cavity, and the signals emitted by the first ultrasonic transducer and the signals emitted by the second ultrasonic transducer form an L-shaped reflection passage at the reflection surface of the reflection device.

15. A gas flow meter, wherein the gas flow meter comprises a display device, a housing and the gas flow metering gas chamber of claim 1.

* * * * *